(12) United States Patent
Jarrahi et al.

(10) Patent No.: US 9,859,079 B2
(45) Date of Patent: Jan. 2, 2018

(54) RECONFIGURABLE DEVICE FOR TERAHERTZ (THZ) AND INFRARED (IR) FILTERING AND MODULATION

(71) Applicant: The Regents of the University of Michigan, Ann Arbor, MI (US)

(72) Inventors: Mona Jarrahi, Los Angeles, CA (US); Mehmet Unlu, Ankara (TR); Christopher W. Berry, Albuquerque, NM (US); Shenglin Li, Aliso Viejo, CA (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 14/910,523

(22) PCT Filed: Aug. 6, 2014

(86) PCT No.: PCT/US2014/049866
§ 371 (c)(1),
(2) Date: Feb. 5, 2016

(87) PCT Pub. No.: WO2015/021100
PCT Pub. Date: Feb. 12, 2015

(65) Prior Publication Data
US 2016/0196943 A1 Jul. 7, 2016

Related U.S. Application Data

(60) Provisional application No. 61/862,730, filed on Aug. 6, 2013.

(51) Int. Cl.
*H01H 1/20* (2006.01)
*H01P 1/12* (2006.01)
(Continued)

(52) U.S. Cl.
CPC ......... *H01H 51/27* (2013.01); *G02B 6/29395* (2013.01); *H01H 49/00* (2013.01);
(Continued)

(58) Field of Classification Search
CPC ...... H01H 50/005; H01H 1/0036; H01H 1/20; H01H 1/5822; H01P 1/127
(Continued)

(56) References Cited

U.S. PATENT DOCUMENTS 6,529,093 B2 * 3/2003 Ma ..................... H01H 59/0009
333/101
7,321,275 B2 * 1/2008 Chou ................. H01H 59/0009
333/105
(Continued)

FOREIGN PATENT DOCUMENTS

KR 1020080004467 A 1/2008

OTHER PUBLICATIONS

International Search Report for application No. PCT/US2014/049866 dated Nov. 20, 2014, 3 pages.
(Continued)

*Primary Examiner* — Dean Takaoka
*Assistant Examiner* — Alan Wong
(74) *Attorney, Agent, or Firm* — Reising Ethington P.C.

(57) ABSTRACT

A reconfigurable device for terahertz (THz) or infrared (IR) ranges that includes a base substrate, a lower array attached to the base substrate, and an upper array attached to the base substrate and at least partially suspended over the lower array. Activation of the reconfigurable device causes the upper array to mechanically flex towards the lower array so that electrical contact is made therebetween. Methods of fabricating and operating the reconfigurable device are also provided.

14 Claims, 10 Drawing Sheets

(51) Int. Cl.
*H01H 51/27* (2006.01)
*G02B 6/293* (2006.01)
*H01H 49/00* (2006.01)
*H01H 50/00* (2006.01)
*H01H 51/32* (2006.01)
*H01H 57/00* (2006.01)
*H01H 59/00* (2006.01)

(52) U.S. Cl.
CPC .......... *H01H 50/005* (2013.01); *H01H 51/32* (2013.01); *H01H 57/00* (2013.01); *H01H 59/0009* (2013.01); *G02B 6/29361* (2013.01); *H01H 2057/006* (2013.01); *H01H 2201/024* (2013.01)

(58) Field of Classification Search
USPC .................................. 333/105, 262; 200/181
See application file for complete search history.

(56) References Cited

U.S. PATENT DOCUMENTS

| | | |
|---|---|---|
| 7,834,722 B2 | 11/2010 | Millet |
| 2005/0236260 A1 | 10/2005 | Pasch et al. |
| 2007/0278075 A1* | 12/2007 | Terano ................. H01P 1/127 200/181 |
| 2008/0001691 A1 | 1/2008 | Hong et al. |
| 2008/0277672 A1 | 11/2008 | Hovey et al. |
| 2012/0122259 A1 | 5/2012 | Tung et al. |

OTHER PUBLICATIONS

Written Opinion for application No. PCT/US2014/049866 dated Nov. 20, 2014, 6 pages.

* cited by examiner

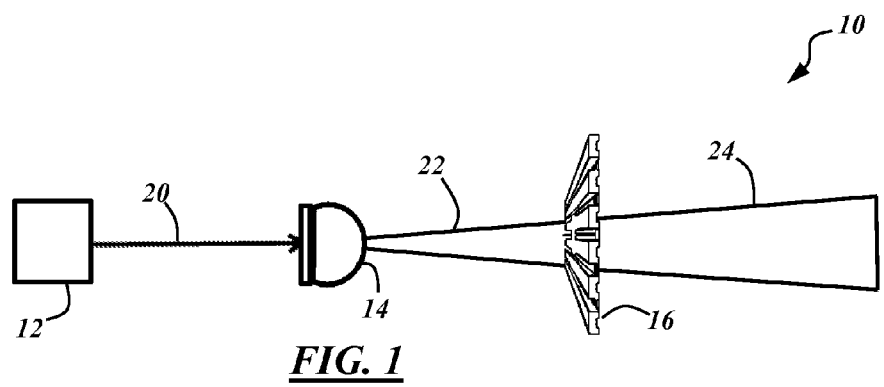
FIG. 1
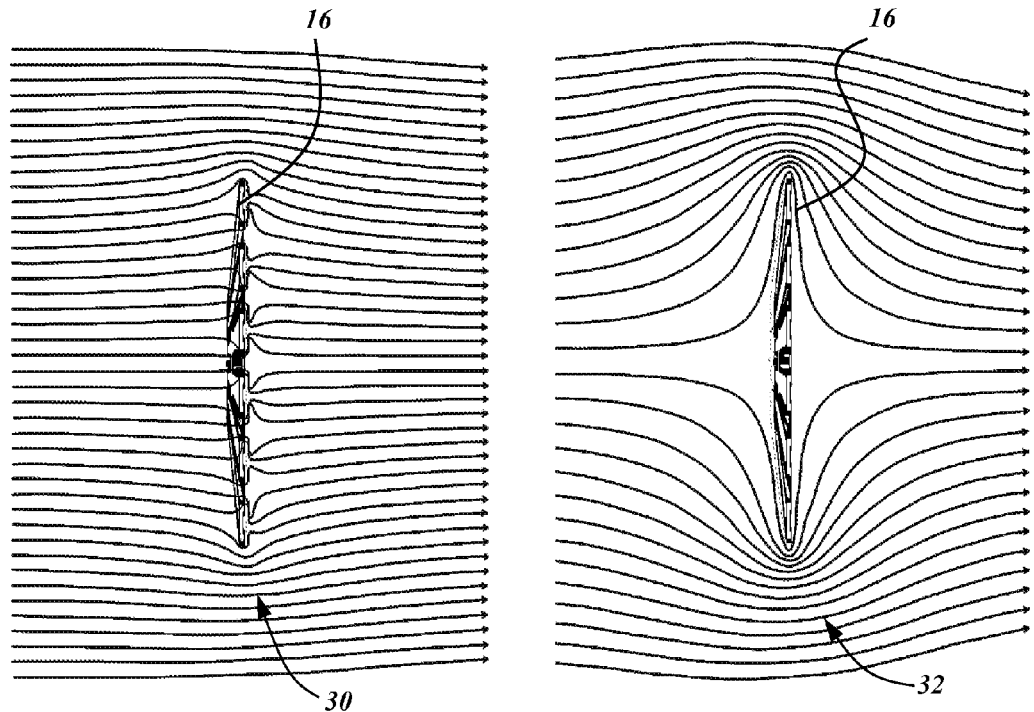
FIG. 2A  FIG. 2B

RECONFIGURABLE DEVICE FOR TERAHERTZ (THZ) AND INFRARED (IR) FILTERING AND MODULATION

STATEMENT REGARDING FEDERALLY FUNDED RESEARCH

This invention was made with government support under CMMI1030270 awarded by the National Science Foundation and W911NF-12-1-0253 awarded by the U.S. Army/Army Research Office. The Government has certain rights in the invention.

TECHNICAL FIELD

This invention relates generally to filters and modulators and, more particularly, to reconfigurable filters and modulators designed for use in the terahertz (THz) and infrared (IR) ranges.

BACKGROUND OF THE INVENTION

Despite much progress in terahertz (THz) technology, existing THz modulators have not yet offered the modulation specifications oftentimes required for high-performance THz imaging, spectroscopy, and communication systems. More specifically, there is a lack of high-performance THz modulators offering large modulation depths over a broad range of THz frequencies.

Modulation schemes and techniques in the visible and infrared regime—such as, for example, those based on carrier injection/depilation in solid-state devices, Mach-Zehnder interferometers, Fabry-Perot filters, liquid crystals, magneto-optic effects, deformable mirrors, and beam deflectors—can have difficulty meeting high-performance modulation specifications at THz frequencies due to the lack of materials with the desired properties at THz frequencies, as well as the practical challenges associated with scaling device dimensions to operate efficiently in the THz regime. Thus, existing modulation schemes and techniques typically offer a tradeoff in terms of modulation depth, modulation bandwidth, modulation speed, modulation voltage, signal attenuation, or some combination thereof, when adapted for operation in the THz regime.

Other modulation schemes and techniques involve the use of metamaterials, which have a spectral response that can be engineered by their geometry, rather than being limited by the characteristics of natural materials at THz frequencies. However, the modulation bandwidth of the demonstrated metamaterial-based terahertz modulators have been somewhat limited by the resonant nature of the device configurations being employed.

SUMMARY

In accordance with an embodiment of the invention there is provided a reconfigurable device for terahertz (THz) or infrared (IR) ranges that includes a base substrate, a lower array attached to the base substrate, and an upper array attached to the base substrate and at least partially suspended over the lower array. Activation of the reconfigurable device causes the upper array to mechanically flex towards the lower array so that electrical contact is made therebetween.

In some embodiments the lower and upper arrays are arranged in the form of a plurality of mechanical switches. And at least some of these mechanical switches may include one or more of the following switches: electrostatic switches, piezoelectric switches, and/or magnetic switches.

The lower array may be a periodic array of stationary conductive elements and may include a plurality of conductive element assemblies, with each conductive element assembly including a long conductive element and a plurality of short conductive elements. In at least some embodiments using the conductive elements, the short conductive elements may be generally parallel to one another and are arranged on the long conductive element as cross-members. And in at least some other embodiments using the conductive elements, the conductive element assemblies may be attached to the base substrate via an intervening insulation layer that electrically isolates the conductive element assemblies from the base substrate.

In some embodiments, the upper array is a periodic array of conductive elements and includes a plurality of flexible conductive elements and a plurality of anchor elements, and each flexible conductive element includes at least one contact arranged on an underside to make contact with an element of the lower array. Each of the plurality of flexible conductive elements may be suspended over the lower array by first and second anchor elements located at opposing ends of the flexible conductive element, and each flexible conductive element may be designed to deflect towards the lower array to make an electrical connection therebetween.

In embodiments using the flexible conductive elements and anchor elements in the upper array, any one or more of the following additional features may be included: (1) at least some of the flexible conductive elements may include a plurality of contacts in the form of dimples that protrude from an underside of the flexible conductive element towards the lower array; (2) the at least one contact may be designed to make a non-perfect contact with an element of the lower array; and (3) the anchor elements may be attached to the base substrate via an intervening insulation layer that electrically isolates the anchor elements from the base substrate.

In some embodiments the lower array, the upper array or both comprise gold or a gold-based alloy.

In accordance with another embodiment of the invention, there is provided a method of fabricating a reconfigurable device for terahertz (THz) or infrared (IR) ranges which includes: providing a base substrate, fabricating a lower array with a plurality of stationary conductive elements on the base substrate, and fabricating an upper array with a plurality of flexible conductive elements on the base substrate. The plurality of flexible conductive elements from the upper array are fabricated so that they are at least partially suspended over the plurality of stationary conductive elements from the lower array.

And in accordance with yet another embodiment of the invention, there is provided a method operating a reconfigurable device for terahertz (THz) or infrared (IR) ranges which includes: providing a reconfigurable device having a lower array and an upper array attached arranged according to a plurality of unit cells, applying an electrical voltage to the reconfigurable device, and rearranging the structural configuration of the plurality of unit cells in response to the applied electrical voltage so that the collective magnetic response of the reconfigurable device to an incident electromagnetic wave in the terahertz (THz) or infrared (IR) range is altered.

It is contemplated that the various features set forth in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

Preferred exemplary embodiments will hereinafter be described in conjunction with the appended drawings, wherein like designations denote like elements, and wherein:

FIG. 1 is a schematic diagram of an exemplary terahertz (THz) system that includes an optical pump, a THz transmitter pumped by the optical pump, and an example of a reconfigurable filter or modulator;

FIGS. 2A, 2B are graphs showing the THz flux interaction with the reconfigurable device of FIG. 1 when the device is in an 'OFF' mode and an 'ON' mode, respectively;

FIG. 12 is a portion of the device that includes a number of MEMS switches, FIG. 13 is an enlarged view of a single MEMS switch in the 'OFF' mode, and FIG. 14 is an enlarged view of the same MEMS switch but in the 'ON' mode.

DETAILED DESCRIPTION OF THE ILLUSTRATED EMBODIMENTS

Figure 3:
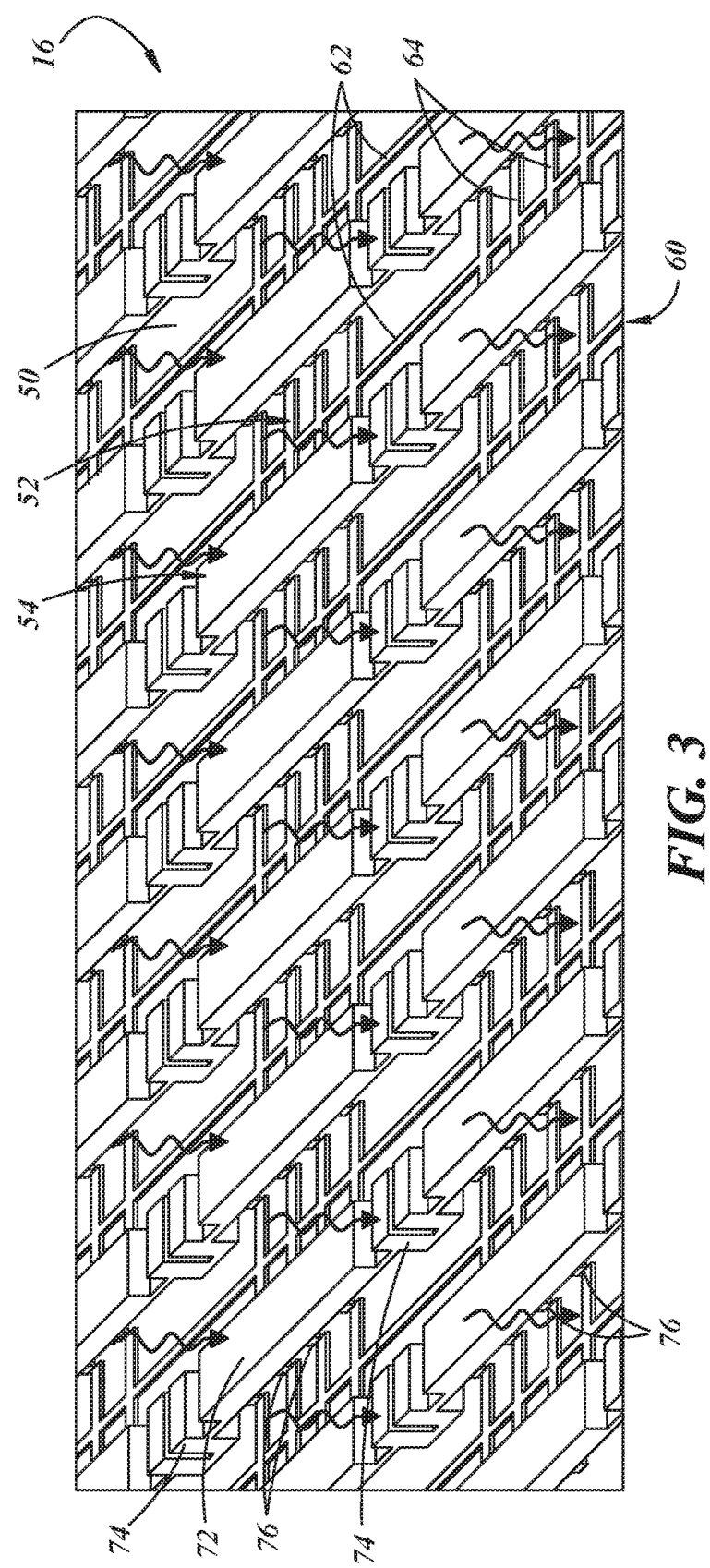
FIG. 3 is an isometric view of a portion of an exemplary reconfigurable device, where the device includes a base substrate, a lower array and an upper array.

A reconfigurable device, as well as methods for fabricating and operating such a device, is described herein and is designed for use in the terahertz (THz) and infrared (IR) ranges. It should be appreciated that this device may operate in a number of different modes, including a filter mode and a separate modulation mode. In the following description, when the reconfigurable device is operating in a filter mode, it is sometimes referred to as a "reconfigurable filter," and when the reconfigurable device is operating in a modulation mode, it is sometimes referred to as a "modulator." Thus, the terms "reconfigurable filter" and "modulator" may be used interchangeably and are collectively or broadly referred to as a "reconfigurable device."

The reconfigurable device described herein meets high performance filtering and/or modulation specifications, such as those oftentimes required by high-performance imaging, spectroscopy, and communication systems. The modulator includes a mechanically reconfigurable multi-layer structure and can offer significant modulation depth and bandwidth, without considerable compromise in terms of modulation speed and voltage, in a fully integrated device configuration. According to one potential embodiment, there is provided a mechanically reconfigurable multi-layer filter that can reconfigure its geometry through the use of a double-layered mesh filter having an array of electrostatically-actuated micro-electrical-mechanical system (MEMS) switches that allow significant changes in the device scattering parameters over a broad range of frequencies. Other types of mechanically reconfigurable switches or surfaces, like those based on piezoelectric material, magnetic material or graphene, may be used instead. This results in a reconfigurable device that can successfully filter, modulate and/or otherwise manipulate the intensity of electromagnetic waves, particularly those in the THz and IR frequency domains, over a broad frequency range.

Skilled artisans will appreciate that the unique capabilities of material, chemical and/or biological sensors based on terahertz (THz) spectrometry offer an exceptional platform for standoff detection of many concealed toxic chemicals and gases, explosives, pathogens, chemical and biological agents. This is because many individual chemicals have their distinctive thermal emission peaks or their rotational or vibrational emission lines in the terahertz portion of the electromagnetic spectrum (e.g., 0.1-10 THz). However, these are not the only applications for the reconfigurable device and methods disclosed herein. Some non-limiting examples of potential applications for the present reconfigurable filter or modulator include, but are certainly not limited to: high-performance THz and IR communication systems; high-performance THz and IR spectroscopy systems for chemical sensing and material characterization; THz and IR imaging systems for medical imaging, material characterization, and industrial quality control; and spatial beam forming for various applications including a single-pixel THz/IR camera through compressive sensing. Moreover, the reconfigurable device may be employed in applications used by various security, military, environmental, scientific (e.g., biological, chemical, etc.), space study, pharmaceutical, and quality control industries, to cite a few possibilities. It should be appreciated that while the reconfigurable device described herein is directed to use in the THz and IR ranges, it is not limited to such and may be used with electromagnetic waves outside of these frequency and wavelength domains.

Turning to FIG. 1, there is shown a schematic diagram of an exemplary terahertz (THz) system 10 that includes an optical pump 12, a THz transmitter 14, and an example of a reconfigurable filter or modulator 16. This system is simply provided to demonstrate one possible implementation or application for the reconfigurable device described herein, but is certainly not the only application. In general operation, the optical pump 12 illuminates or pumps the THz transmitter 14 with an optical beam 20 that causes the THz transmitter 14 to emit a first THz beam 22. The first THz beam 22 is incident upon and is manipulated by reconfigurable device 16 so that a second filtered or modulated THz beam 24 is ultimately provided. FIGS. 2A and 2B illustrate the potential performance of such a system, where FIG. 2A shows the THz flux interaction 30 with the reconfigurable device 16 when the device is in an 'OFF' mode and FIG. 2B shows the THz flux interaction with the reconfigurable device 16 when the device is in an 'ON' mode. The degree to which the unfiltered THz beam 22 interacts with the reconfigurable device 16 (in this case, the THz flux interaction) is clearly much greater when the device is operating in the 'ON' mode, as illustrated by the graphs. In FIG. 2A there is efficient electromagnetic flux transmission through the reconfigurable device 16 when the device is in a weak diamagnetic state, and in FIG. 2B there is strong electromagnetic flux exclusion from the reconfigurable device region when it is in a strong diamagnetic state. As will be explained in greater detail, the reconfigurable device 16 exhibits switchable diamagnetism so that it is able to dynamically switch or change modes over a broad range of THz and IR ranges.

Reconfigurable Device (Filter or Modulator)—

With reference to FIGS. 3-8, there are shown enlarged views of portions of the reconfigurable device 16. According to this particular embodiment, the reconfigurable device 16 is provided as a mechanically reconfigurable multi-layer filter and includes a base substrate 50, a lower array 52, and an upper array 54. In other embodiments, however, the reconfigurable device 16 can be provided as a modulator, a reconfigurable metasurface, a reconfigurable frequency selective surface, or a spatial beam modulator, to cite several possibilities. The base substrate 50 may be made of high resistivity silicon or any other suitable material known in the art and acts as an electrostatic actuation pad and a foundational substrate layer to which the different arrays or layers can be attached. Of course, electro-static switches are not the only possibility, as switches based on piezoelectric and/or magnetic materials may be used as well.

Figure 4:
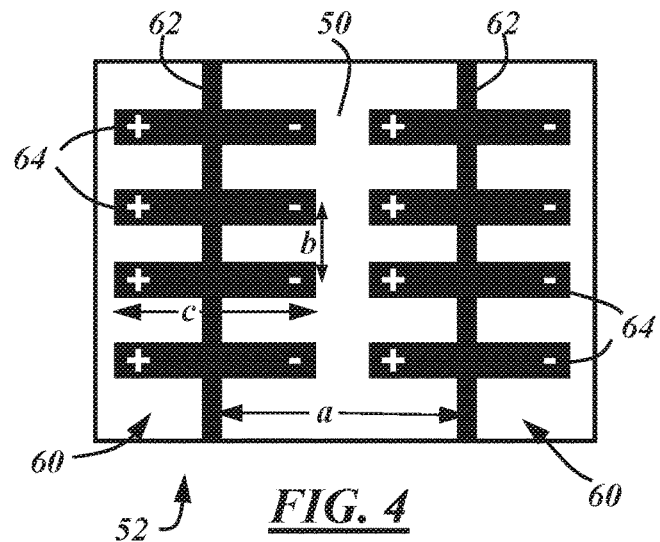
FIGS. 4, 5 and 6 are plan views of a portion of the lower array of FIG. 3, the upper array of FIG. 3, and the combination of the lower and upper arrays, respectively.
Figure 5:
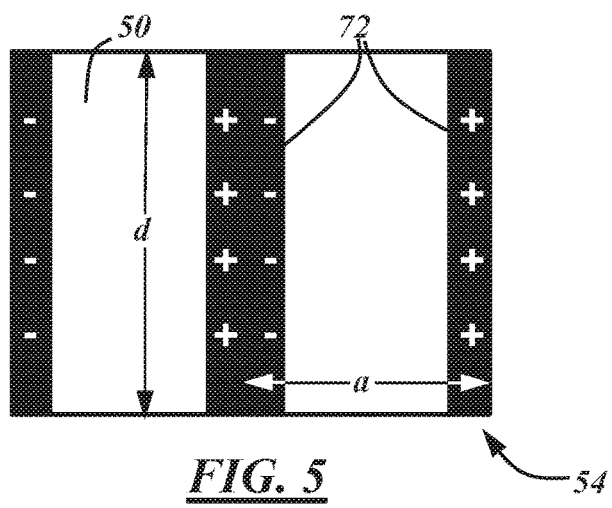
Figure 6:
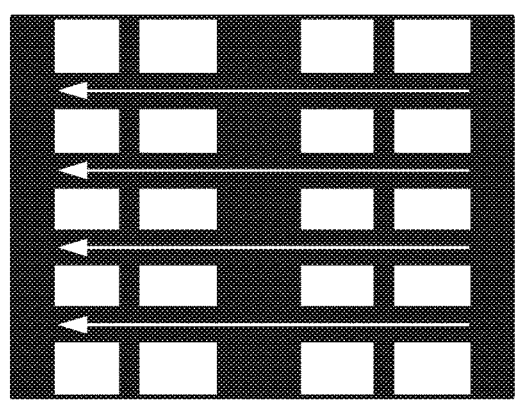
Figure 7:
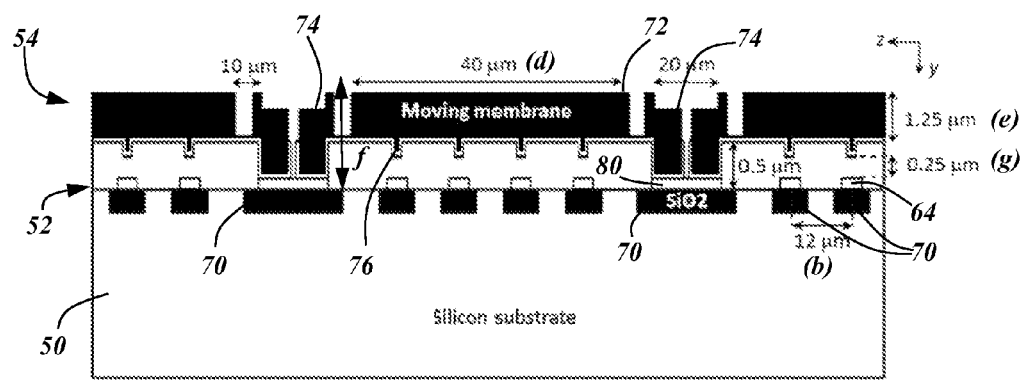
FIG. 7 is a sectional view of a portion of the reconfigurable device of FIG. 3.
Figure 8:
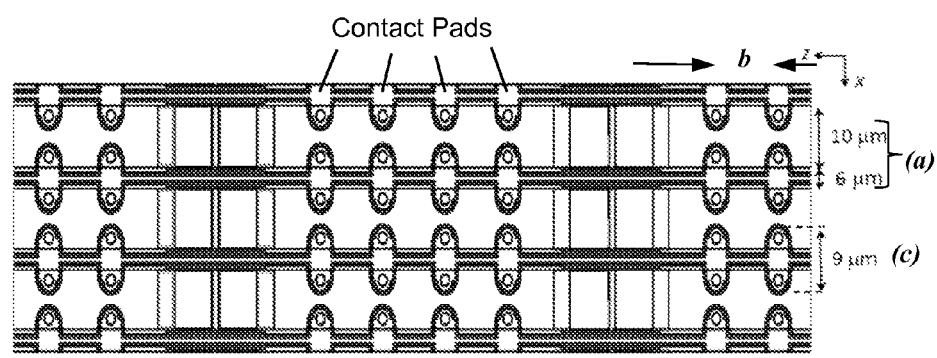
FIG. 8 is a plan view of a portion of the reconfigurable device of FIG. 3.

The lower array 52 is a static or fixed array of conductive elements that are arranged in a mesh-like or periodic configuration on the base substrate 50 and act as contacts for the upper array 54. With particular reference to FIGS. 3, 4 and 6, the lower array 52 is mounted or fabricated on a surface of the base substrate 50 and includes a number of conductive element assemblies 60 (extend in x-z plane) that are somewhat tree-like in structure and are generally arranged so that they are parallel to one another. Each of the conductive element assemblies 60 further includes a number of long conductive elements or slits 62 (extend in z-axis direction) and short conductive elements or patches 64 (extend in x-axis direction), where the short conductive elements are attached to the long conductive elements in the form of cross-members and act as contact pads for cooperating elements of the upper array 52, as will be explained. The long conductive elements 62 are arranged so that they are generally parallel to the other long conductive elements, and the short conductive elements 64 are arranged so that they are generally parallel to the other short conductive elements, thus, producing a periodic mesh-like array of conductive elements that together make up the lower array 52. In FIG. 4, as well as FIG. 5, the + and − signs refer to the induced dipole moments as a result of the incident electromagnetic force on the metal electrons of the reconfigurable device 16, and in FIG. 6, the arrows refer to the induced surface current as a result of the incident electromagnetic force on the metal electrons of the lower and upper array components. It should be appreciated that the particular design or arrangement of the arrays 52, 54 shown in FIGS. 3-6 represents only one exemplary mesh filter arrangement, and that other arrangements and geometries may certainly be used instead. In general, when the reconfigurable device (whether it is operating in a filter, modulator or other mode) is OFF, there are discontinuities in the metallic structure of the device in the direction of the incident electromagnetic electric field. Mechanical reconfiguration turns the reconfigurable device ON so that the discontinuities in the metallic structure are largely eliminated. This results in a reconfigurable device where, in an OFF mode, the device structure is dominated by electric dipoles and, in an ON mode, the device structure is dominated by magnetic dipoles.

The various elements of the lower array 52 may be made from any number of suitable conducting materials, including gold (Au) and gold-based alloys that are known in the art to be good conductors in MEMS switches. Each of the elements of the lower array 52 is attached to the base substrate 50 via an intervening insulation layer 70, such as one made from $SiO_2$ (see FIG. 7), which electrically isolates the conductive elements of the lower array 52 from the base substrate 50. The particular dimensions and sizes of the lower array 52 are largely dictated by the particular application and/or mode in which the reconfigurable device 16 is to be used, which takes into account the frequency or wavelength regimes involved and the operational parameters desired. In a non-limiting example where the reconfigurable device 16 is designed for use as a modulator over a 1.5 THz frequency band and has a cutoff frequency of more than 3 THz during modulation ON and OFF modes, the lower filter array 52 preferably has sub-wavelength dimensional spacing (i.e., the spacing between elements of the lower array is generally less than the wavelengths of the incident THz and IR waves). For example, conductive element assemblies 60 may be spaced from one another by a distance (a) of approximately 16 µm, the short conductive members 64 may be spaced from one another by a distance (b) of approximately 12 µm, and the short conductive members 64 may have a length (c) of approximately 9 µm. The distance (b) between the short conductive elements or contact pads 64 can have particular relevance, as this dimension along with other dimensions of elements 64 can influence the cutoff frequency and other operating characteristics of the reconfigurable filter 16. Of course, the preceding dimensions are only meant to illustrate a potential scale and size of the elements involved and are in no way meant to limit the structure.

The upper array 54, on the other hand, is a dynamic or flexible array of conductive elements that are arranged overtop of the lower array 52 and are designed to deflect towards and away from the lower array so that they selectively make or break contact with the lower array based on the state of the reconfigurable device 16. As best illustrated in FIGS. 3, 5 and 6, the upper array 54 includes a number of flexible conductive elements 72 (extend in z-axis direction), anchor elements 74 (extend in y-axis direction), and contacts 76 located on the underside of the flexible conductive elements. Each of the flexible conductive elements 72 can bend and is suspended over the lower array 52 by a pair of anchor elements 74 located at each end so that the lower and upper arrays can act as a series of multi-contact micro-mechanical-electrical system (MEMS) switches. The anchor elements 74 act as century posts at each end of the flexible conductive element 72 and maintain the flexible conductive element in a suspended fashion so that it acts as a flexible beam or membrane suspended above and spaced from the lower array 52; the spacing is just enough so that application of a proper voltage to the reconfigurable device can cause the suspended beam to deflect towards the lower array 52 and establish an electrical connection there between. The flexible conductive elements 72 are arranged so that they are generally parallel to one another.

Figure 9:
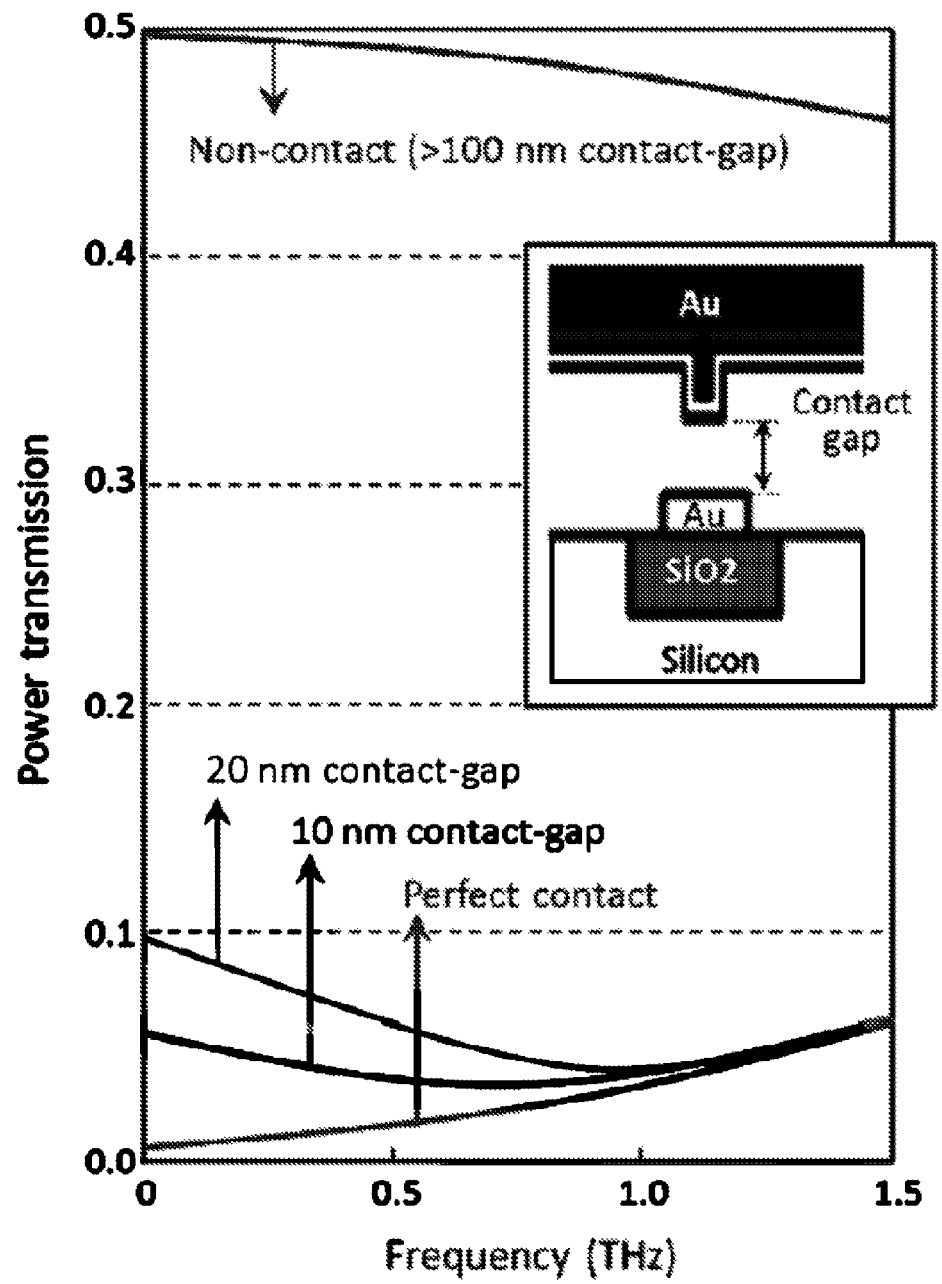
FIG. 9 is a graph showing power transmission through the reconfigurable device of FIG. 3, where the graph illustrates power transmission for both perfect and non-perfect contacts.

The contacts 76 are formed on the underside of the flexible conductive elements 72 and are preferably provided as dimples or as other suitable shapes so that they can adequately establish an electrical connection with the corresponding short conductive elements 64 or other contact pads when element 72 flexes or deflects in that direction. This suspended beam configuration with elements 72 having a relatively long length may help accomplish several objectives: it accommodates multiple pairs of contacts 76 on the underside of each element 72 (e.g., four contact pairs) such that the spacing between contact pairs is relatively small, as is required for broadband operation at THz frequencies; it also provides for large actuation areas that are typically required for switch operation at low actuation voltages; and it simplifies biasing the two-dimensional array of MEMS switches with the small spacing required for broadband operation of the designed modulator, to cite a few examples. In one example, the contacts 76 are purposely designed to be non-perfect; that is, they are designed so that when a flexible conductive element 72 bends towards several short conductive elements 64 there is a very small gap between the two metallic elements (e.g., a gap of between 10-20 nm). This small gap may slightly impact the performance of the reconfigurable device, but it can greatly improve the robustness or durability of the flexible conductive elements 72 which will bend or deflect many, many times during the life of the device. As illustrated in FIG. 9, the estimated transmission of a horizontally-polarized electromagnetic wave through the reconfigurable device 16, as a function of the contact gap between the contacts 76 and the elements of the lower array 52, is quite good. That graph demonstrates efficient transmission of the horizontally-polarized electromagnetic wave for contact gaps as small as 100 nm, as well as modulation depth levels of more than 90% for contact gaps as large as 10 nm.

The various elements of the upper array 54 may also be made from any number of suitable conducting materials, including electroplated gold (Au) and gold-based alloys that are known in the art to be good conductors in MEMS switches. Like the elements of the lower array 52, the anchor elements 74 are also attached to the base substrate 50 via an intervening insulation layer 70, such as one made from $SiO_2$ (see FIG. 7), which electrically isolates the anchor elements 74 from the base substrate 50. The particular dimensions and sizes of the arrays 54 are largely dictated by the particular mode and/or application in which the reconfigurable device 16 is to be used, which takes into account the frequency or wavelength regimes involved and the operational parameters desired. In a non-limiting example where the reconfigurable device 16 is designed for use as a modulator over a 1.5 THz frequency band and has a cutoff frequency of more than 3 THz during modulation ON and OFF modes, the upper array 54 preferably has sub-wavelength dimensional spacing (i.e., the spacing between elements of the upper array are generally less than the wavelengths of the incident THz and IR waves). For example, the flexible conductive elements 72 (i.e., the flexibly beams or membranes) may have a length (d) of approximately 40 µm and a thickness (e) of approximately 1.25 µm, the anchor elements 74 may have a height (f) of approximately 1.75 µm, and a contact gap or spacing (g) between the contacts 76 and the various conductive elements of the lower array 52 may be approximately 0.25 µm. Because the flexible conductive elements 72 are designed to line up with and be located over top of long conductive elements 62, the spacing between flexible elements may also be a distance (a) of approximately 16 µm, A relatively thick metal layer (e) of about 1.25 µm, for example, may help the flexible conductive elements 72 achieve flatness of the contact areas and high spring constants. The contact gap (g) between the upper and lower array elements is preferably selected to achieve low actuation voltages and high actuation speeds while accounting for possible bending of the flexible conductive elements 72 over time as a result of uncompensated stress of the elements 72. Of course, the preceding dimensions are only meant to illustrate the potential scale and size of the elements involved and are in no way meant to limit the structure.

Method of Fabricating—

Figure 10:
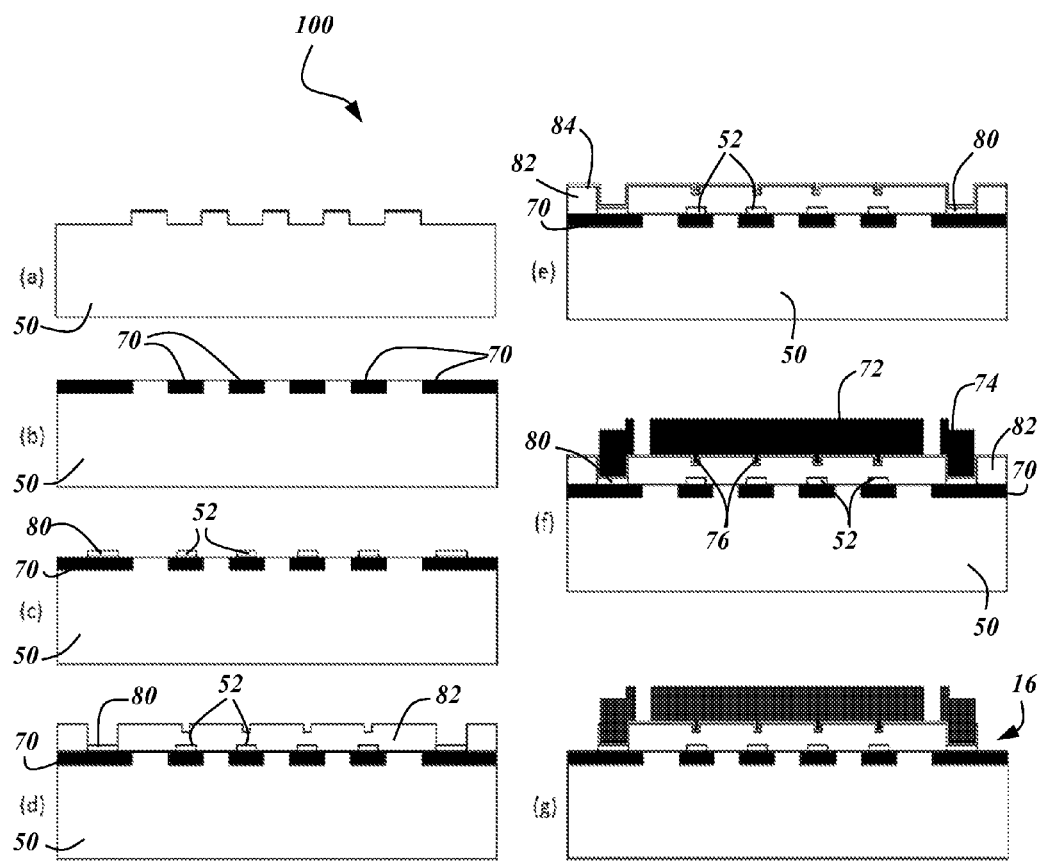
FIG. 10 is a schematic view of a sequence of steps that may be used in a fabrication method to manufacture the reconfigurable device of FIG. 3.

Turning to FIG. 10, there is shown a sequence of schematic drawings that illustrate one potential embodiment of a fabrication method 100 that may be used to create the reconfigurable device described herein. According to one potential embodiment, method 100 fabricates the reconfigurable device 16 using a six-mask surface micromachining process on a high-resistivity Si wafer.

Beginning with the step that is depicted in panel (a), the method generally starts by defining the actuation areas where the different conductive elements of the upper and lower arrays 52, 54 are going to be formed on the base substrate 50 via the intervening insulation layer 70. As shown in panel (a), the actuation areas can be defined or otherwise created by silicon reactive ion etching or some other suitable etching technique.

Next, panel (b) shows a step of the method where the intervening insulation layer 70 is deposited in the voids or spaces that were etched in the previous step. Different techniques may be used to accomplish this deposition process, including using plasma enhanced chemical vapor deposition to deposit $SiO_2$ insulating pads or elements in the etched out spaces. The base substrate or wafer 50 may then be planarized using a chemical mechanical polishing technique to create a planar surface across the top of the base substrate.

Various elements of the lower and upper arrays 52, 54, as well as any needed bias lines, may then be formed on the planarized surface of the base substrate 50, as depicted in panel (c). One technique for carrying out this method step is a sputtering technique, such as one employing Ti/Au/Ti (100/1000/100 Å), followed by lift off. According to the example shown here, this step results in the formation of the conductive element assemblies 60 which are part of the lower array 52, as well as contact pads 80 which are located underneath the anchor elements 74 and are part of the upper array 54.

The next step in the fabrication method is shown in panel (d) and involves applying a sacrificial layer 82 that is patterned for the subsequent creation of the anchor elements 74 and contacts or dimples 76. More specifically, it is possible for this step to use a PMMA/PMGI sacrificial layer 82 (e.g., one about 0.5 µm thick) that is spin coated and patterned, as described above, using two separate masks.

Next, a thin layer 84 is deposited on top of the sacrificial layer 82 and acts as the seed layer for electroplating the various elements of the upper array 54. This step is depicted in panel (e). In one potential example, the thin layer 84 is a Ti/Au layer (e.g., about 100/2500 Å) that is deposited on the sacrificial layer 82 using a suitable sputtering technique.

At this point, the proper layers are in place to form the main portions of the upper array 54; namely the flexible conductive elements 72 with contacts 76 located underneath, as well as the anchor elements 74. According to the non-limiting example illustrated in panel (f), a relatively thick gold (Au) layer (e.g., one about 1.0 µm thick) is electro-plated for the anchor elements 74 and the thick metal part in the center of the flexible conductive elements 72 which are the flexible membranes mentioned above.

Finally, the thin seed layer 84 and the sacrificial layer 82 are removed using a process, such as wet etching. More specifically, the thin seed layer 84 is removed except for areas under the MEMS switch. The reconfigurable device 16, which is shown in panel (g), can then be released using critical point drying or some other suitable technique. In order to simplify reconfigurable filter characterization, a rectangular metallic aperture of approximately 1 mm×1 mm may be fabricated around the device prototypes to ensure that the transmitted terahertz (THz) power through the structure has fully interacted with the device active area.

Figure 11:
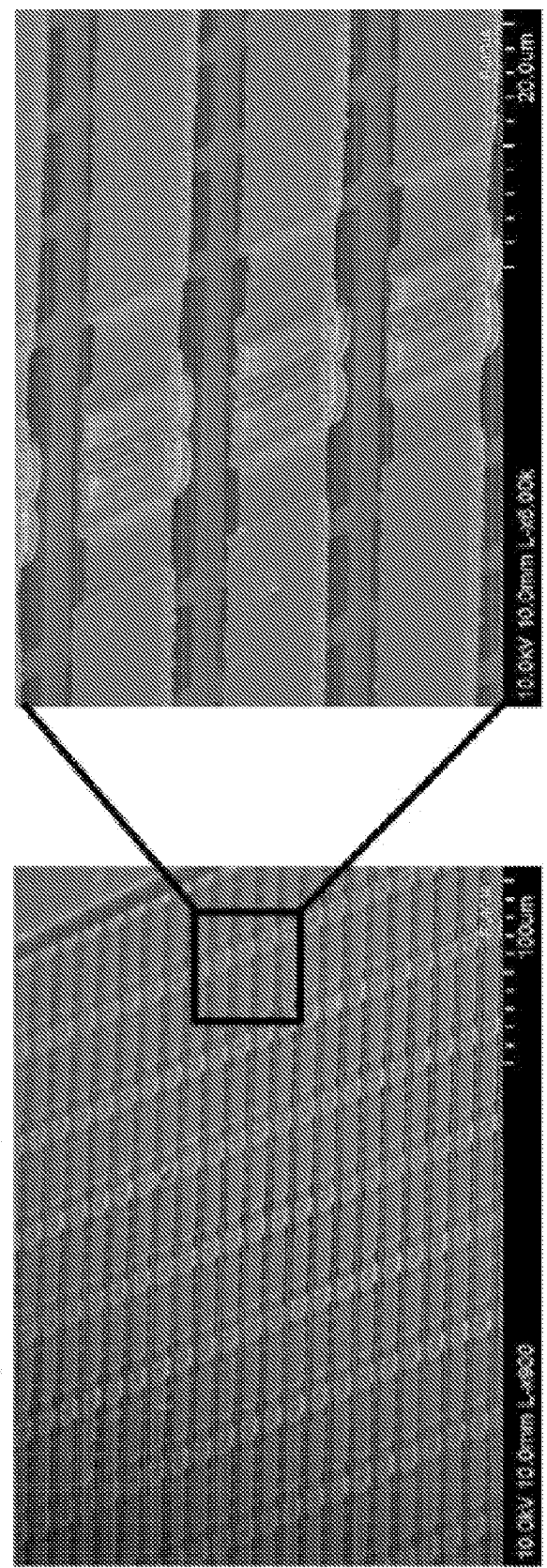
FIGS. 11A, 11B are enlarged scanning electron microscope (SEM) images of a particular embodiment of the exemplary reconfigurable device of FIG. 3 after it has been fabricated, with FIG. 11A being at ×900 magnification and FIG. 11B being at ×6,000 magnification.

FIGS. 11A, 11B are scanning electron microscope (SEM) images of reconfigurable device 16 after it has been fabricated, with FIG. 11A (×900) showing a portion of the overall reconfigurable device and FIG. 11B (×6,000) showing an enlarged portion of the reconfigurable device so that electrostatically-actuated micro-electrical-mechanical system (MEMS) switches can be seen in more detail.

Method of Operating—

Figure 12:
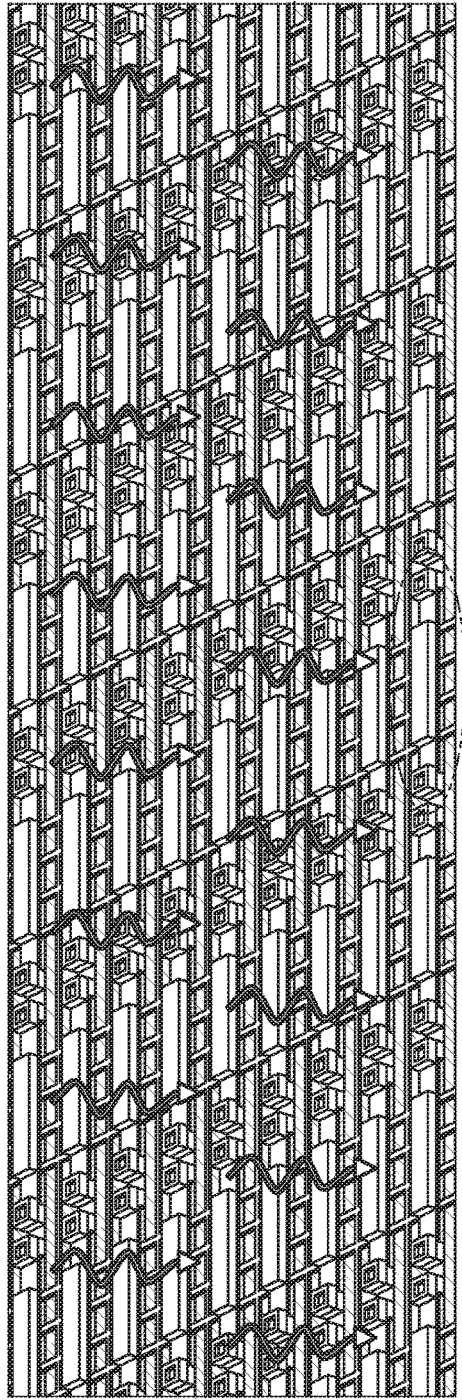
FIGS. 12-14 are isometric views of portions of the reconfigurable device of FIG. 3, where
Figure 14:
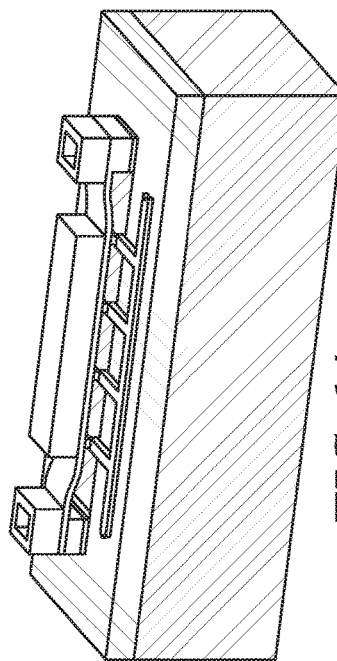
Figure 13:
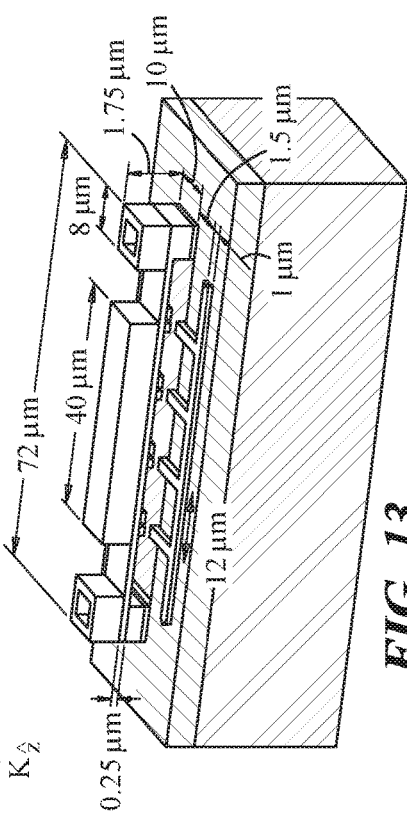

Turning now to FIGS. 12-14, there is described a potential method of operating a reconfigurable device, such as the reconfigurable filter or modulator 16 that was previously described. According to the non-limiting example provided below, the reconfigurable device 16 is used to provide broadband, extreme diamagnetic switching at or near room temperature. By reshaping the structural configuration of the strongly coupled meta-molecule unit cells of the reconfigurable device 16, their collective magnetic response to an incident electromagnetic wave can be altered.

When the reconfigurable device 16 is being operated as a modulator and is in a modulation 'OFF' or 'capacitive' mode (i.e., when the lower and upper arrays 52, 54 are not in electrical contact with one another), each of the MEMS switches in the device acts as a low-pass filter (capacitive mesh structure) for horizontally-polarized incident electromagnetic waves. In this mode or state, the metal electrons in the modulator 16 cannot gain kinetic energy from the incident electromagnetic wave, as their acceleration path is constrained in the horizontal direction (x-axis direction). Conversely, when the modulator 16 is in a modulation 'ON' or 'inductive' mode (i.e., when the upper array 54 is deflected towards and is in electrical contact with the lower array 52), each of the MEMS switches in the reconfigurable device acts as a high-pass filter (inductive mesh structure) for horizontally-polarized incident electromagnetic waves. During this mode or state, the metal electrons in the reconfigurable device 16 are able to gain kinetic energy from the incident electromagnetic wave since their acceleration path is not constrained in the horizontal direction (x-axis direction) by the combination of the upper and lower arrays in contact with one another. This creates a surface current that is illustrated by the arrows in FIG. 6. The low-pass and high-pass filters mentioned above may exhibit similar cutoff frequencies due to the geometry of the reconfigurable device 16.

Starting with the modulation 'OFF' mode, which is demonstrated in FIG. 13, the flexible conductive element 72 of the upper array 54 (i.e., the flexible beam or membrane) is suspended over top of the conductive elements of the lower array 52 so that they are not in electrical contact with one another. Put differently, in this state the lower and upper arrays 52, 54 are electrically isolated from one another. When a horizontally-polarized electromagnetic wave is incident upon the reconfigurable device 16 in this mode or state, the incident electromagnetic wave creates a horizontal force on the metal electrons in both of the lower and upper arrays. If the periodicity and feature size of the arrays, also referred to as mesh filters, in the horizontal direction are much smaller than the incident electromagnetic wavelength, the metal discontinuities prevent the electrons form accelerating in the horizontal direction to gain kinetic energy. In this situation, the lower and upper arrays 52, 54 are effectively invisible to the incident electromagnetic wave, allowing efficient transmission of the incident electromagnetic wave through the structure. As a result, both the lower and upper arrays 52, 54 behave like low-pass or capacitive filters for horizontally-polarized incident electromagnetic waves, with a cutoff frequency that is inversely proportional to the periodicity and feature size of the arrays in the horizontal direction. The geometry of the lower and upper arrays 52, 54 may be set to offer a cutoff frequency exceeding 3 THz for the combination of the two arrays when operating as capacitive structures; this can achieve efficient transmission of horizontally-polarized electromagnetic waves over a broad range of THz frequencies during the modulation 'OFF' mode.

When a sufficient electrical voltage is applied between the upper array 54 and the base substrate 50, an induced electrostatic force is established that causes the flexible elements of the upper array 54 to deflect towards and contact the conductive elements of the lower array 52. The electrical contact that is made between the conductive elements of the upper and lower arrays causes the reconfigurable device 16 to switch from the modulation 'OFF' mode to the modulation 'ON' mode; this is an activation of a MEMS switch. All of the flexible conductive elements 72 may be electrically connected to one another so that the entire upper array 54 can be simultaneously deflected or bent into contact with the lower array by controlling the voltage difference between the upper array 54 and the base substrate 50. Therefore, the reconfigurable device 16 exhibits diamagnetic switching capability, as it can switch between a weak diamagnetic state (modulation OFF) and a strong diamagnetic state (modulation ON). As mentioned above, it may be beneficial to provide flexible conductive elements 72 with relatively thick metal layers (e.g., approximately 1.25 µm), as this added girth can assist with the flatness of the contact areas (i.e., the areas where contacts 76 touch the lower array 52) and can help achieve the high spring constants required for high speed switching. Some of the dimensions of the reconfigurable device can be specifically selected to achieve low switching voltages (e.g., about 30 V) and high switching speeds (e.g., >20 KHz), while accounting for possible bending in the flexible conductive elements 76 as a result of uncompensated stress of those membranes. Other considerations could also be taken into account, of course, when designing the reconfigurable device described herein. In those embodiments where the upper and lower arrays are electrically connected to one another, such as the one described here, the electrical voltage could be applied to either array or layer; in those embodiments where the upper and lower arrays are electrically isolated from one another, then it is preferable to apply the voltage to the upper array to electrostatically deflect the switch.

In the modulation 'ON' mode, which is demonstrated in FIG. 14, the flexible conductive element 72 of the upper array 54 deflects towards and contacts the conductive elements of the lower array 52 so that they are in electrical contact with one another. The combined lower and upper arrays 52, 54 in contact with each other form a two-dimensional array of metallic loops or elements, as demonstrated by the representation in FIG. 6. When a horizontally-polarized electromagnetic wave is incident on the reconfigurable device 16 in this mode or state, the resulting horizontal force on the metal electrons in both of the lower and upper arrays is able to accelerate the metal electrons so that they gain kinetic energy. The strength of the induced magnetic field in response to the horizontally-polarized incident electromagnetic wave is strong for sub-wavelength unit cell sizes in the vertical direction (z-axis direction). This strong diamagnetic behavior is the result of efficient energy transfer from the incident electromagnetic wave to the kinetic energy of the metal electrons, producing an opposing magnetic filed that cancels the incident field in this region of the reconfigurable device. If the periodicity and feature size of the lower and/or upper array elements (e.g., if the spacing (b) between short conductive elements 64) in the vertical direction (z-axis direction) are much smaller than the incident electromagnetic wavelength, a large fraction of the incident electromagnetic energy will be converted to the kinetic energy of the metal electrons, which re-radiate the incident electromagnetic wave in the opposite direction, leading to a significant drop in the electromagnetic transmission through the reconfigurable device or surface. When connected, the lower and upper arrays 52, 54 can behave like a high-pass filter (inductive structure) with a cutoff frequency that is inversely proportional to the periodicity of the short conductive elements 64 in the vertical or z-axis direction.

Figure 15:
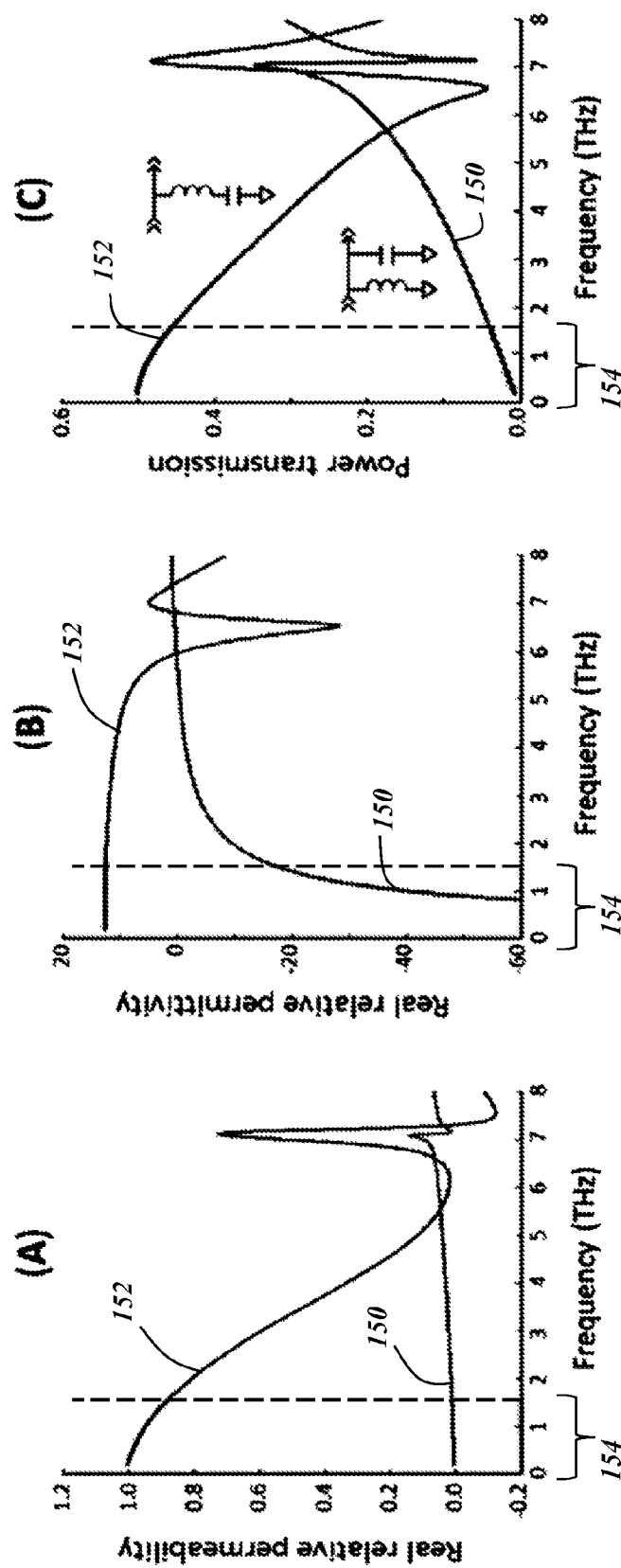
FIGS. 15A-C are graphs showing the relative permeability, relative permittivity, and electromagnetic power transmission through the reconfigurable device of FIG. 3 for a horizontally-polarized incident electromagnetic wave, the graphs show the device in both an 'OFF' mode and an 'ON' mode.

Illustrations of this phenomenon can be seen in FIGS. 15A-C, where extracted relative permeability, relative permittivity, and electromagnetic power transmission through the reconfigurable device 16 for a horizontally-polarized incident electromagnetic wave are shown during a modulation 'OFF' or a weak diamagnetic state (curves 150) and during a modulation 'ON' or a strong diamagnetic state (curves 152). FIGS. 15A-C were created with a finite-element-based full-wave electromagnetic solver (ANSYS HFSS) using a robust material constitutive effective parameters retrieval method. In FIG. 15A, the reconfigurable device 16 exhibits permeability over a 1.5 THz frequency band from $\mu_r > 0.9$ to $\mu_r < 7 \times 10^{-3}$; In FIG. 15B, the reconfigurable device 16 exhibits a similar permittivity behavior over a 1.5 THz frequency band; and in FIG. 15C, the reconfigurable device or surface modulates the intensity of terahertz (THz) waves with more than 90% modulation depth over a 1.5 THz frequency band. Skilled artisans will appreciate that the reconfigurable device 16 exhibits an extraordinary switching of the scattering parameters over a broad frequency band 154—a functionality that is typically only offered by superconductors when cooled below their critical temperatures. This results in a unique advantage in that the strong and weak diamagnetism are exhibited over a frequency band that can be set by the feature size of the reconfigurable device or surface 16 in the vertical and horizontal direction, respectively. Accordingly, the reconfigurable device 16 described herein can offer broadband diamagnetic switching through structural miniaturization.

Figure 16:
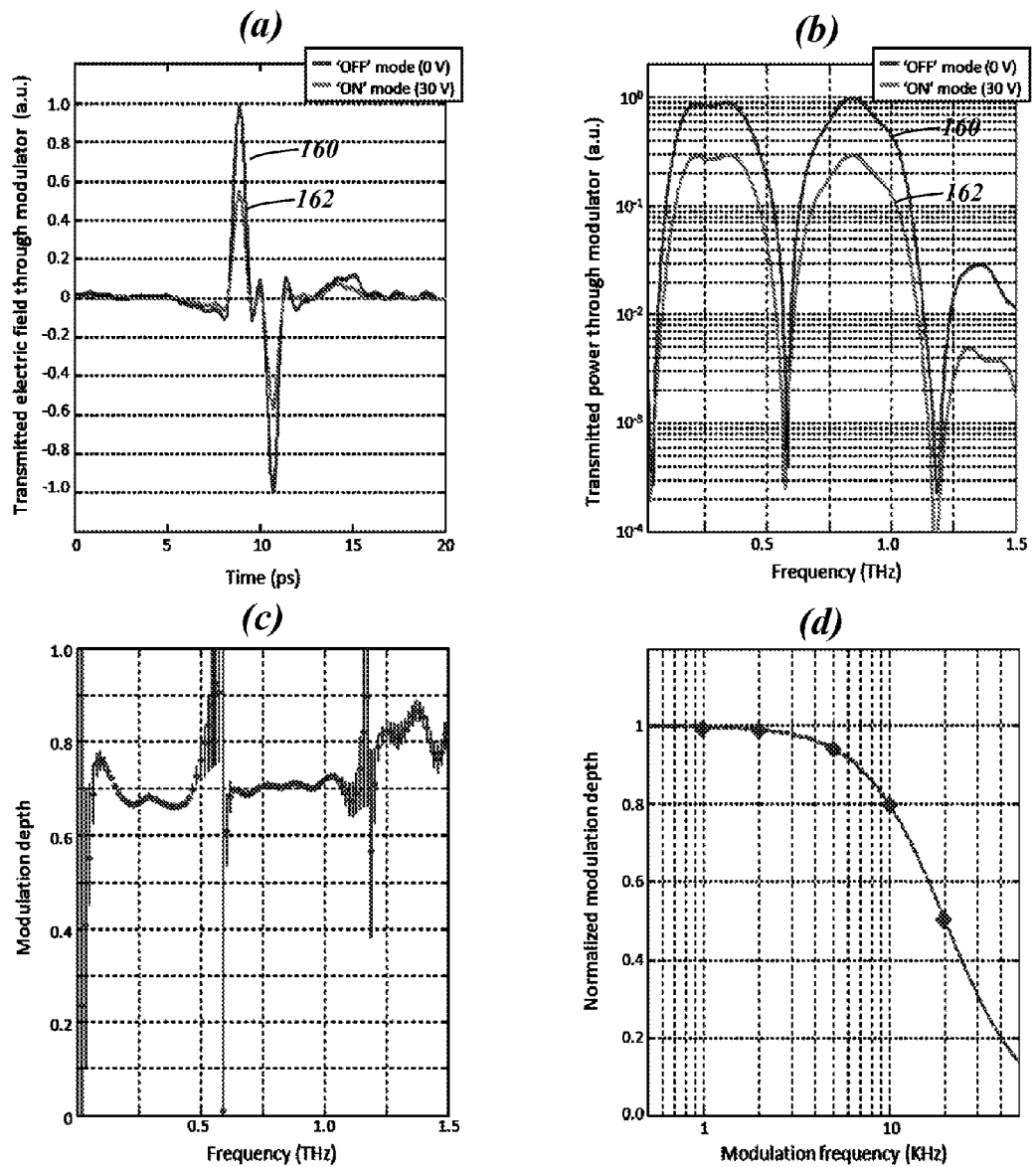
FIGS. 16A-D are graphs showing experimental results of a prototype modulator showing (a) the electric field of the transmitted THz pulse through the modulator, (b) the power transmission spectrum of a THz pulse incident on the modulator, (c) the modulation depth of the modulator, and (d) the dynamic characteristics of the modulator showing modulation depth as a function of modulation speed.

Similarly promising results were shown by the experimental results displayed in FIGS. 16A-D, which is based on a proof-of-concept terahertz (THz) modulator having a reconfigurable device or surface with diamagnetic switching capability. FIG. 16A illustrates the electric field of a transmitted THz pulse through the modulator at a bias voltage of 0 V (modulation 'OFF' mode) and 30 V (modulation 'ON' mode). The OFF mode is represented by curve 160 and the ON mode is represented by curve 162. FIG. 16B shows the power transmission spectrum of a THz pulse incident on the modulator over a 1.5 THz frequency range during the modulation ON and OFF modes. The observed spectral dips are the result of the apertures used for focusing THz pulses onto the reconfigurable device being tested. With reference to FIG. 16C, there is shown the modulation depth of the modulator, calculated using the power transmission spectra during the modulation OFF and ON mode. This graph indicates more than 70% modulation depth over the 1.5 THz frequency band, and the data error bars are calculated using the noise power level of the time-domain THz spectroscopy setup used for characterizing the modulator performance. The calculated modulation depth is quite accurate for the 1.5 THz frequency range, except at frequencies that the apertures used for focusing THz pulses onto the modulator severely attenuate power transmission. Lastly, FIG. 16D illustrates the dynamic characteristics of the modulator, characterized by measuring the electric field of the transmitted THz pulses through the modulator while alternating the bias voltage between 0 V and 30 V. The calculated THz modulation depth as a function of the modulation speed indicates modulations speeds exceeding 20 KHz. Some of the difference between the estimated performance of a modulator (FIGS. 15A-C) and the actual performance of a prototype modulator (FIGS. 16A-D) can be attributable to fabrication misalignments, which can cause a non-uniform spacing between some of the components of the device. Other factors could contribute to the discrepancies as well.

It should be noted that because of their relatively large feature size in the vertical direction, the lower and upper arrays 52, 54 behave like inductive mesh filters for vertically-polarized electromagnetic waves independent of the operational mode or state of the reconfigurable device. This prevents transmission of a major fraction of vertically-polarized electromagnetic waves through the reconfigurable device and, therefore, offers a polarization-sensitive modulation or filter performance that is required for many imaging applications.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An electromagnetic wave modulator for use with incident terahertz (THz) or infrared (IR), electromagnetic waves, comprising:
    a base substrate;
    a lower array attached to the base substrate, the lower array comprising conductive elements arranged in a mesh or periodic configuration that forms a metallic structure having discontinuities; and
    an upper array attached to the base substrate and at least partially suspended over the lower array, the upper array comprising conductive elements located above the discontinuities in the metallic structure of the lower array;
    wherein the electromagnetic wave modulator has sub-wavelength spacing between at least some of the conductive elements of the upper array, the lower array, or both, relative to a wavelength of the incident THz or IR electromagnetic waves;
    wherein activation of the electromagnetic wave modulator causes the upper array to mechanically flex towards the lower array so that electrical contact is made between the conductive elements of the upper and lower arrays, wherein the electrical contact eliminates the discontinuities in the metallic structure so as to alter the magnetic response of the electromagnetic wave modulator to the incident THz or IR electromagnetic waves.

2. The electromagnetic wave modulator of claim 1, wherein the lower and upper arrays are arranged in the form of a plurality of mechanical switches.

3. The electromagnetic wave modulator of claim 2, wherein the plurality of mechanical switches includes at least one switch selected from the group of: electrostatic switches, piezoelectric switches, or magnetic switches.

4. The electromagnetic wave modulator of claim 1, wherein the conductive elements of the lower array is comprise a periodic array of stationary conductive elements, wherein the array of stationary conductive elements are arranged as a plurality of conductive element assemblies, wherein each conductive element assembly includes a long conductive element and a plurality of short conductive elements.

5. The electromagnetic wave modulator of claim 4, wherein the plurality of short conductive elements are generally parallel to one another and are arranged on the long conductive elements as cross-members, and wherein adjacent ones of the short conductive elements have the sub-wavelength spacing between them.

6. The electromagnetic wave modulator of claim 4, wherein the plurality of conductive element assemblies are attached to the base substrate via an intervening insulation layer that electrically isolates the conductive element assemblies from the base substrate.

7. The electromagnetic wave modulator of claim 1, wherein the upper array is a periodic array of the conductive elements and includes a plurality of flexible conductive elements and a plurality of anchor elements supporting the flexible conductive elements above the conductive elements of the lower array, and wherein each flexible conductive element includes at least one contact arranged on an underside to make the electrical contact with one or more of the conductive elements of the lower array.

8. The electromagnetic wave modulator of claim 7, wherein each of the plurality of flexible conductive elements is suspended over the lower array by first and second anchor elements located at opposing ends of the flexible conductive element, and wherein each flexible conductive element is configured to deflect towards the lower array to make an electrical connection therebetween.

9. The electromagnetic wave modulator of claim 7, wherein each of the plurality of flexible conductive elements includes a plurality of contacts in the form of dimples that protrude from an underside of the flexible conductive element towards the lower array.

10. The electromagnetic wave modulator of claim 7, wherein the at least one contact is configured to make a non-perfect contact with an element of the lower array.

11. The electromagnetic wave modulator of claim 7, wherein the plurality of anchor elements are attached to the base substrate via an intervening insulation layer that electrically isolates the anchor elements from the base substrate.

12. The electromagnetic wave modulator of claim 1, wherein the lower array, the upper array or both comprise gold or a gold-based alloy.

13. A method of fabricating a electromagnetic wave modulator for use with incident terahertz (THz) or infrared (IR), electromagnetic waves, comprising the steps of:
    providing a base substrate;
    fabricating a lower array on the base substrate using a plurality of stationary conductive elements arranged in a mesh or periodic configuration that forms a metallic structure having discontinuities; and
    fabricating an upper array with a plurality of flexible conductive elements supported on the base substrate, wherein the plurality of flexible conductive elements from the upper array are fabricated so that they are at least partially suspended over the plurality of stationary conductive elements from the lower array, the flexible conductive elements including contacts positioned above the stationary conductive elements of the lower array such that when the flexible conductive elements are mechanically flexed towards the lower array, electrical contact is made between the contacts of the flexible conductive elements and the stationary conductive elements of the lower array so as to eliminate the discontinuities in the metallic structure; and
    wherein the electromagnetic wave modulator has sub-wavelength spacing between at least some of the conductive elements of the upper array, the lower array, or both, relative to a wavelength of the incident THz or IR electromagnetic waves.

14. A method of operating a electromagnetic wave modulator for use with incident terahertz (THz) or infrared (IR) electromagnetic waves, comprising the steps of:
    providing an electromagnetic wave modulator having a lower array and an upper array configured as a plurality of unit cells;
    applying an electrical voltage to the electromagnetic wave modulator; and
    rearranging the structural configuration of the plurality of unit cells in response to the applied electrical voltage so that the collective magnetic response of the electromagnetic wave modulator to an incident electromagnetic wave in the terahertz (THz) or infrared (IR) range is altered.

* * * * *

UNITED STATES PATENT AND TRADEMARK OFFICE
CERTIFICATE OF CORRECTION

PATENT NO. : 9,859,079 B2
APPLICATION NO. : 14/910523
DATED : January 2, 2018
INVENTOR(S) : Mona Jarrahi et al.

It is certified that error appears in the above-identified patent and that said Letters Patent is hereby corrected as shown below:

On the Title Page

Item (73), remove Assignee "The Regents of the University of Michigan, Ann Arbor, MI (US)" and add --The Regents of the University of California, Oakland, CA (US)--.

Signed and Sealed this
Eighteenth Day of February, 2020

Andrei Iancu
*Director of the United States Patent and Trademark Office*